A. D. LEE.
SCRUBBER.
APPLICATION FILED JULY 1, 1909.

988,272.

Patented Mar. 28, 1911.

2 SHEETS—SHEET 2.

Witnesses:
Howard Hanscom
Nathan C. Lombard

Inventor:
Alva D. Lee,
by Walter E. Lombard,
Atty.

UNITED STATES PATENT OFFICE.

ALVA D. LEE, OF BOSTON, MASSACHUSETTS, ASSIGNOR TO LEE FURNACE AND BURNER COMPANY, A CORPORATION OF NEW YORK.

SCRUBBER.

988,272.  Specification of Letters Patent.  Patented Mar. 28, 1911.

Application filed July 1, 1909. Serial No. 505,772.

*To all whom it may concern:*

Be it known that I, ALVA D. LEE, a citizen of the United States of America, and a resident of Boston, in the county of Suffolk and State of Massachusetts, have invented certain new and useful Improvements in Scrubbers, of which the following is a specification.

This invention relates to scrubbers and especially to an apparatus of this class which is particularly adapted for use in the treatment of various ores although the apparatus may be used for a variety of other purposes.

The invention consists in certain novel features of construction and arrangement of parts which will be readily understood by reference to the description of the drawings and to the claims hereinafter given.

Figure 1:
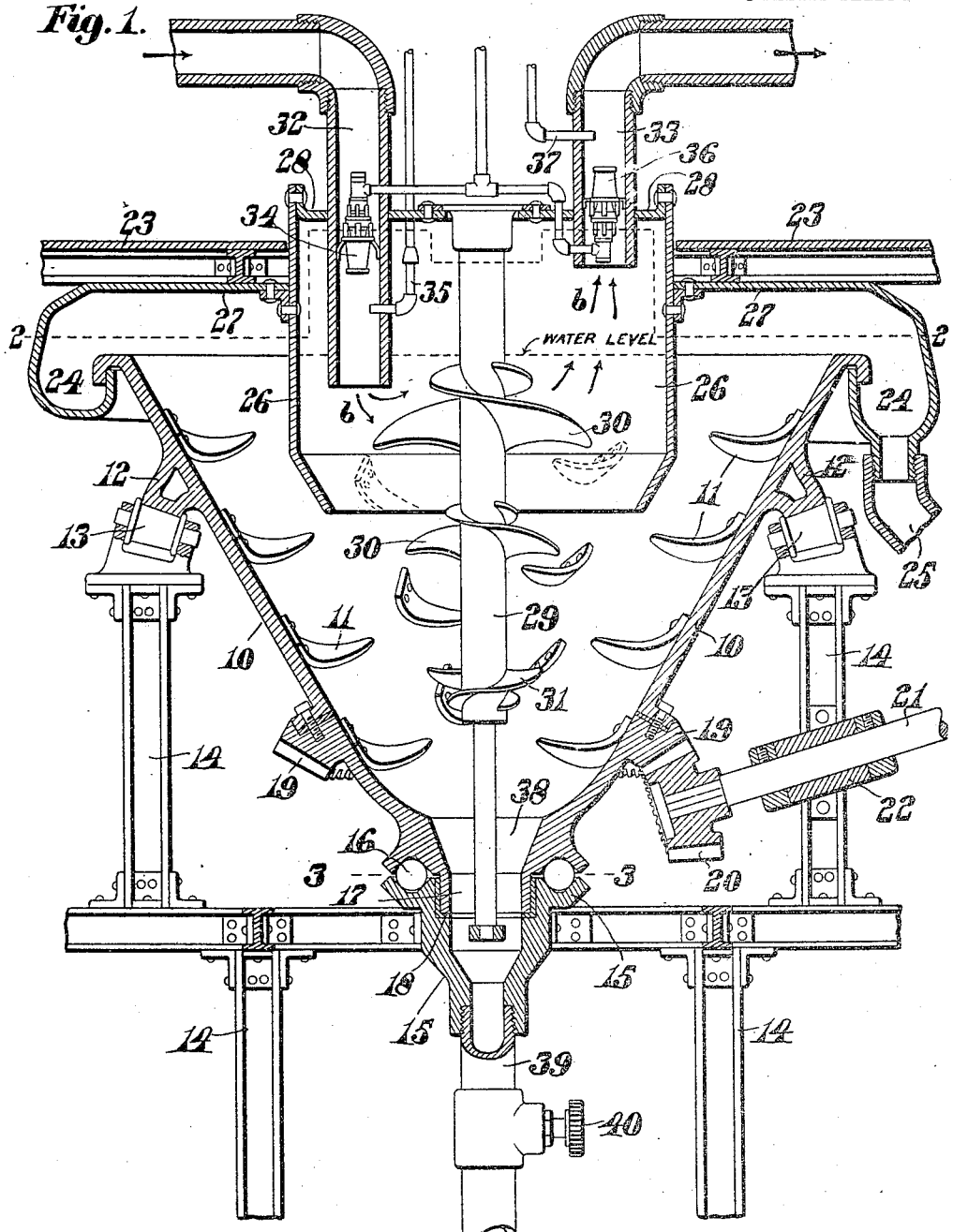
Figure 2:
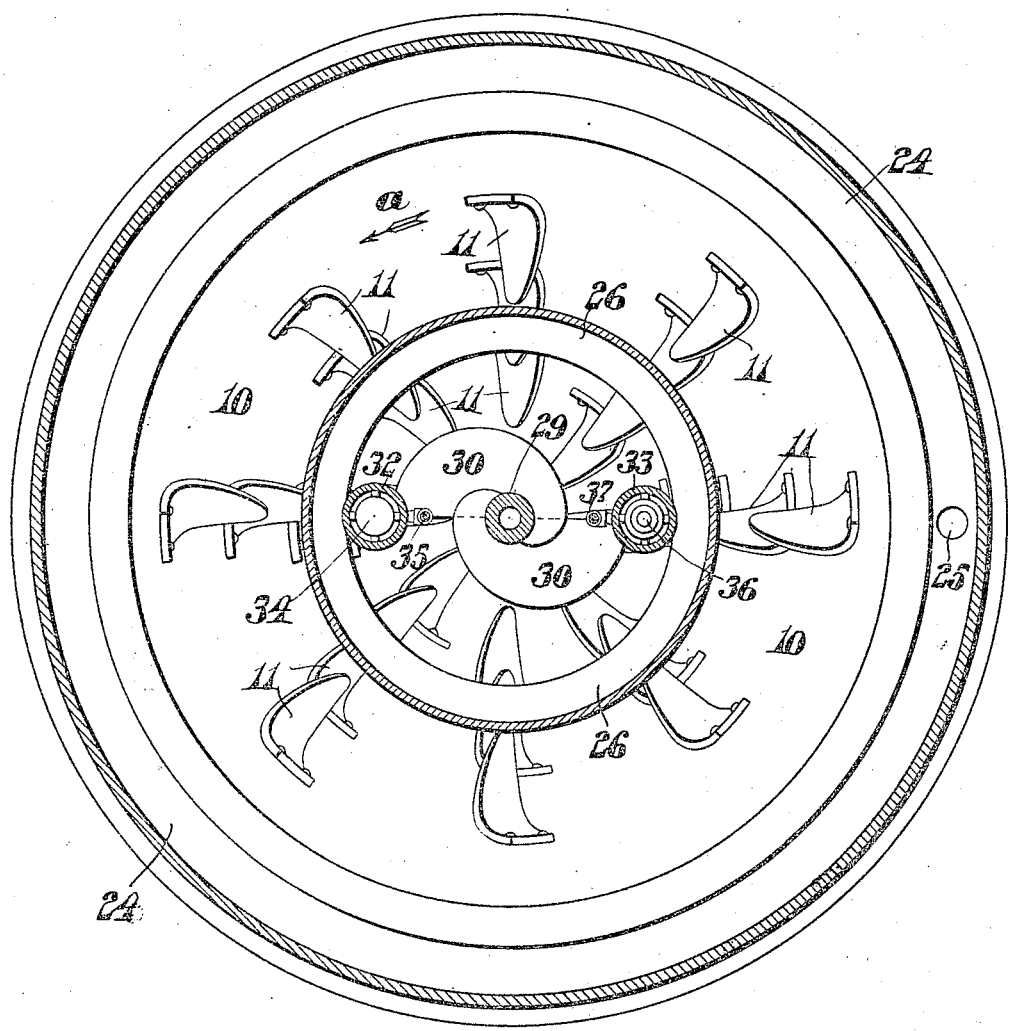
Figure 3:
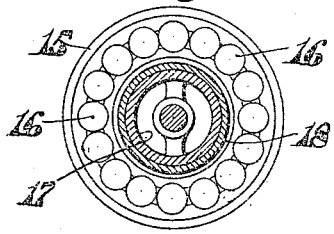

Of the drawings: Figure 1 represents a vertical section of an apparatus embodying the features of this invention. Fig. 2 represents a horizontal section of the same, the cutting plane being on line 2—2 on Fig. 1, and Fig. 3 represents a horizontal section of the same, the cutting plane being on line 3—3 on Fig. 1.

Similar characters designate like parts throughout the drawings.

In the drawings, 10 represents a conical tank the interior wall of which is provided with a plurality of curved blades 11 the curvature of which is so constructed as to cause the contents of the tank coming in contact with these blades to be lifted during the revolution of the tank. The outer periphery of the tank is provided with an annular flange 12 which rests upon the anti-friction rollers 13 revoluble in suitable bearings upon a framework 14 of any well-known construction. This framework 14 is also provided with a tubular member 15 the upper face of which is provided with an annular track in which the anti-friction members 16 are adapted to move, the lower end of the tank 10 being provided with a similar track resting upon said anti-friction members, thus forming a suitable thrust bearing for said tank.

The lower end of the tank 10 is provided with an annular projection 17 extending into a depression in the upper end of the member 15 and between this projection 17 and the wall of the depression in the member 15 is interposed a suitable packing 18.

The tank 10 is provided on its outer periphery with a gear 19 with which meshes a pinion 20 secured to or formed upon the drive shaft 21 mounted in a bearing 22 on the framework 14. When suitable power is applied to the drive shaft 21 it is obvious that the tank 10 may be revolved at any desired speed, in the direction of the arrow *a* on Fig. 2 of the drawings, the blades 11 secured to or formed upon the inner wall of the tank acting upon the contents of the tank coming into contact therewith to lift that portion of the material. As is shown in the drawings the blades 11 are arranged spirally upon the inner wall of the tank 10.

Above the tank 10 is a charge floor 23 to the under side of which is secured an annular overflow trough 24 into which the contents of the tank are adapted to overflow and be carried away through the outlet 25. An inverted drum 26 is secured to the top plate 27 of the overflow trough 24, this drum having its outer end closed as at 28 while the inner end is open and beneath the water line of the tank 10. By means of the trough 24 the cover 27 and the inverted drum 26—28 the tank is wholly inclosed. The drum 26 is in axial line with the tank 10 and secured to the head 28 and to the member 15, and in axial line with the tank is a fixed member 29 provided with a plurality of screw propeller blades 30 and 31. The upper screw propeller blades 30 are so constructed as to force the contents of the tank downwardly as they come into contact with the blades during the revolution of the tank 10. The lower screw propeller blade 31 is curved in the opposite direction so that as the contents of the tank 10 come into contact therewith during the revolution of the tank the material is diverted upwardly. It is obvious therefore that as the tank revolves about the fixed central member 29 and the screw propeller thereon the blades 11 on the tank will cause a thorough mixing of the material contained within the tank and cause a vortical movement thereof, thus causing a very effectual intermingling of the contents of the tank.

Extending into the inverted drum 26 and beneath the water level therein is an inlet pipe 32 communicating with a furnace or any other suitable receptacle and through which gas from said furnace or other receptacle is adapted to pass into the interior of the drum 26 and through the liquid contained therein, said gas passing through this liquid in the direction of the arrows $b$ into an outlet pipe 33 which is adapted to convey the purified gases into a gasometer or into another scrubber where the operation may be repeated to more effectually purify the gases being treated.

In the inlet pipe 32 is a suitable steam jet blower 34, the outlet from which is in the direction of the open end of the inlet pipe 32 so that when the steam is turned on a suction is created in the pipe which will draw the gases from the furnace or other receptacle through the pipe 32 and cause them to pass through the steam jet and also through a spray of water delivered through the pipe 35 into the inlet pipe 32 between the nozzle of the steam jet blower and the outlet end of the inlet pipe 32. The pipe 33 is similarly provided with a steam jet blower 36 the delivery end of which is outward from the drum 26 and said pipe 33 has delivered thereto in front of the said steam jet 36 a spray of water through the pipe 37 so that a suction is created in the pipe 33 to cause the withdrawal of the purified gases from the tank 26. A central passage 38 at the bottom of the tank 10 communicates with the pipe 39 in which is placed a cut-out valve 40 normally closed.

When the apparatus is in operation the tank 10 is revolved at any desired rate of speed and the jet blowers 34 and 36 and the water sprays 35 and 37 are set in operation and the tank soon becomes filled with water to the level indicated in Fig. 1, any exhaust thereof overflowing into the trough 24 and passing away through the overflow outlet pipe 25. When the steam jet blowers commence to operate a suction is created in the pipes 32 and 33 and the gas from the furnace or other receptacle is drawn through the pipe 32 and downwardly into the water contained within the tank 10. While passing through this water it will be so agitated by means of the revolution of the tank 10 and the various blades 11, 30, and 31 acting upon the contents of the tank that the impurities contained within the gas will be separated therefrom and deposited in the lower part of the tank and through the passage 38 into the pipe 39. It is obvious that all of the heavier particles contained within the gas will seek their lowest level and drop into this portion of the tank while the remainder of the gas with these heavier particles removed therefrom will be drawn out of the drum 26 by the suction of the jet blower 36 of the pipe 33 where it may pass into another scrubber to be more thoroughly treated or into a gasometer where it may be stored in its purified state.

This makes a very effective apparatus which is particularly adapted for use in connection with the refining of certain ores containing a variety of metallic particles, the heavier parts of which are adapted to drop to the bottom of the tank and be drawn off through the pipe 39 when the valve 40 is open while the lighter particles will be retained in the gaseous mixture by the complete agitation of the contents of the tank and be drawn off with the gas into another receptacle.

It is believed that the operation and many advantages of the invention will be thoroughly understood from the foregoing description.

Having thus described my invention, I claim:

1. An apparatus of the nature disclosed combining a mixing tank adapted to contain liquid at a predetermined level, an inverted drum having a dome free from open perforations and having an opened end which depends into said tank below the level of said liquid, a gas pipe having a tight fit through said drum and terminating therein below said liquid level, and a gas outlet pipe having a tight fit through said drum and terminating therein above the level of the liquid.

2. An apparatus of the nature disclosed combining a mixing tank adapted to contain liquid at a predetermined level, an inverted drum having a dome free from open perforations and having an opened end depending into said tank below the level of said liquid, a gas inlet pipe having a tight fit through the dome of said drum and terminating therein below said liquid level, a device for creating a suction in said inlet, and a gas outlet pipe having a tight fit through said drum and terminating therein above the liquid in said tank.

3. In a device of the class described, the combination of a mixing tank adapted to contain liquid; an inverted drum closed at the top and having an open end which extends into said tank; a gas inlet to the interior of said drum extending below the water line; a steam jet blower in said inlet; means adapted to discharge a supply of water in the path of said steam jet blower; and a gas outlet from said drum the inner end of which is above the liquid in said tank.

4. In a device of the class described, the combination of a mixing tank adapted to contain liquid; an inverted drum closed at the top and having an open end which extends into said tank; a gas inlet to the interior of said drum extending below the water line; a gas outlet from said drum the inner end of which is above the liquid in said tank; a steam jet blower in said outlet for creating a suction; and means adapted to discharge a supply of water in the path of said steam jet blower.

5. An apparatus of the nature disclosed combining a revoluble tank adapted to contain liquid at a predetermined level, a stationary inverted drum having a dome free from open perforations and having an opened end depending into said revoluble tank below the level of the liquid therein, a gas inlet pipe having a tight fit through the dome of said drum and terminating therein below the level of said liquid, a gas outlet pipe having a tight fit through the dome of said drum and terminating therein above the liquid in said tank, and a device in each pipe for creating a suction therein.

6. In a device of the class described, the combination of a revoluble tank adapted to contain liquid; a fixed inverted drum closed at the top and having an open end which extends into said tank below the water line; a gas inlet pipe extending into said drum with its discharge below the water line; a gas outlet pipe from said drum the inner end of which is above the liquid in said tank; a device in each pipe for creating a suction therein; and a water spray in each of said pipes.

7. In a device of the class described, the combination of a revoluble tank adapted to contain liquid; a fixed inverted drum closed at the top and having an open end which extends into said tank below the water line; a gas inlet pipe extending into said drum with its discharge end below the water line; a gas outlet pipe from said drum the inner end of which is above the liquid in said tank; a device in each pipe for creating a suction therein; and means within said tank for creating a circulation of its contents.

8. In a device of the class described, the combination of a revoluble tank adapted to contain liquid; a fixed inverted drum closed at the top and having an open end which extends into said tank below the water line; a gas inlet pipe extending into said drum with its discharge end below the water line; a gas outlet pipe from said drum the inner end of which is above the liquid in said tank; a device in each pipe for creating a suction therein; and a plurality of mixing blades within said tank for creating a circulation of its contents.

9. In a device of the class described, the combination of a revoluble tank; a fixed inverted drum the open end of which extends into said tank below the water line; a gas inlet pipe extending into said drum with its discharge end below the water line; a gas outlet pipe from said drum; a device in each of said pipes for creating a suction therein; a fixed member secured in the center of said tank provided with a plurality of propeller blades; and a plurality of blades secured to the inner wall of said tank.

10. In a device of the class described, the combination of a revoluble tank; a fixed inverted drum the open end of which extends into said tank below the water line; a gas inlet pipe extending into said drum with its discharge end below the water line; a gas outlet pipe from said drum; a device in each of said pipes for creating a suction therein; a fixed member secured in the center of said tank provided with a plurality of propeller blades; and a plurality of blades secured to the inner wall of said tank, said propeller blades and tank blades being so curved as to cause a vortical movement of the materials contained in said tank during its rotation.

11. In a device of the class described, the combination of a revoluble tank; a fixed inverted drum the open end of which extends into said tank below the water line; a gas inlet pipe extending into said drum with its discharge end below the water line; a gas outlet pipe from said drum; a device in each of said pipes for creating a suction therein; a fixed member secured in the center of said tank provided with a plurality of propeller blades; a plurality of blades secured to the inner wall of said tank, said propeller blades and tank blades being so curved as to cause a vortical movement of the materials contained in said tank during its rotation; and an annular trough surrounding said tank adapted to carry away the overflow from said revoluble tank.

Signed by me at 4 Post Office Sq., Boston, Mass., this 24th day of December, 1908.

ALVA D. LEE.

Witnesses:
EDNA C. CLEVELAND,
WALTER E. LOMBARD.